(12) United States Patent
Kobuse

(10) Patent No.: US 11,184,565 B2
(45) Date of Patent: Nov. 23, 2021

(54) IMAGE PICKUP APPARATUS AND ITS CONTROL METHOD

(71) Applicant: CANON KABUSHIKI KAISHA, Tokyo (JP)

(72) Inventor: Takenori Kobuse, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/830,724

(22) Filed: Mar. 26, 2020

(65) Prior Publication Data

US 2020/0336683 A1    Oct. 22, 2020

(30) Foreign Application Priority Data

Apr. 16, 2019    (JP) .............................. JP2019-077864

(51) Int. Cl.
*H04N 5/355*    (2011.01)
*H04N 5/374*    (2011.01)
(Continued)

(52) U.S. Cl.
CPC ..... *H04N 5/35536* (2013.01); *H04N 5/37457* (2013.01); *H04N 5/3765* (2013.01)

(58) Field of Classification Search
CPC .. H04N 3/35536; H04N 5/374; H04N 5/3765; H04N 5/235; H04N 5/35572; H04N 5/378; H04N 9/045; H03G 3/00
(Continued)

(56) References Cited

U.S. PATENT DOCUMENTS 7,297,917 B2 * 11/2007 Olsen ...................... H04N 5/243
250/208.1
7,443,435 B2 * 10/2008 Loose ...................... H04N 3/14
348/294

(Continued)

FOREIGN PATENT DOCUMENTS

JP    2005175517 A    6/2005
JP    2015128253 A    7/2015

*Primary Examiner* — Marly S Camargo
(74) *Attorney, Agent, or Firm* — Carter, DeLuca & Farrell LLP

(57) ABSTRACT

An object of the present invention is to obtain an image having a better S/N ratio in accordance with gain settings in an image pickup apparatus that enables amplifying a signal based on output of a photoelectric conversion unit, with a plurality of gains. An image pickup element provided in an image pickup apparatus has a photoelectric conversion unit in which unit pixels are arranged in a matrix and a signal voltage is generating by photoelectric conversion. A column amplifier of the image pickup element can amplify the signal voltage photoelectrically converted with a plurality of gains. An image pickup element control unit performs drive control of the image pickup element to perform gain settings. An image composition unit performs image composition by using a plurality of image signals having different gains. When the image pickup element changes an amplification factor of the column amplifier to output image signals with a plurality of gains, the image pickup element control unit changes a value of a second gain that is smaller than that of a first gain among the gains and performs control so as not to change the value of the first gain.

17 Claims, 6 Drawing Sheets

(51) Int. Cl.
*H04N 5/376* (2011.01)
*H04N 5/378* (2011.01)
*H04N 9/04* (2006.01)
*H03G 3/00* (2006.01)
*H04N 5/235* (2006.01)
*H04N 5/3745* (2011.01)

(58) Field of Classification Search
USPC ......... 348/300, 308, 229.1, 255, 221.1, 362, 348/470, 572; 250/208.1; 257/291, 292, 257/443; 341/139, 126, 155, 158; 330/59, 254, 278, 307; 382/270
See application file for complete search history.

(56) References Cited

U.S. PATENT DOCUMENTS

| | | | | |
|---|---|---|---|---|
| 7,830,436 B2 * | 11/2010 | Sumida | ............... | H04N 5/243 348/300 |
| 7,880,783 B2 * | 2/2011 | Irie | ............... | H04N 9/735 348/248 |
| 9,088,741 B2 | 7/2015 | Sumi et al. | | |
| 9,445,029 B2 | 9/2016 | Shimizu | | |
| 9,918,017 B2 * | 3/2018 | Rivard | ............... | H04N 5/2355 |
| 10,477,121 B2 * | 11/2019 | Machida | ............... | H04N 5/332 |
| 10,638,066 B2 * | 4/2020 | Kobayashi | ............... | H04N 5/355 |
| 2008/0251695 A1 * | 10/2008 | Kamom | ............... | H04N 5/235 250/208.1 |
| 2009/0027516 A1 * | 1/2009 | Suzuki | ............... | H04N 5/235 348/300 |
| 2010/0066858 A1 * | 3/2010 | Asoma | ............... | H04N 5/2353 348/229.1 |
| 2014/0184844 A1 * | 7/2014 | Muto | ............... | H04N 5/355 348/302 |
| 2014/0184895 A1 * | 7/2014 | Muto | ............... | H04N 5/355 348/300 |
| 2019/0319056 A1 * | 10/2019 | Yamashita | ............... | H01L 27/14605 |
| 2020/0336681 A1 * | 10/2020 | Kobuse | ............... | H04N 5/357 |
| 2020/0344443 A1 * | 10/2020 | Kobuse | ............... | H04N 5/361 |
| 2021/0112214 A1 * | 4/2021 | Machida | ............... | H04N 5/5742 |

* cited by examiner

IMAGE PICKUP APPARATUS AND ITS CONTROL METHOD

BACKGROUND OF THE INVENTION

Field of the Invention

The present invention relates to a technique of operation control for an image pickup element that can read pixel signals by amplification with a plurality of gains, and relates to a technique of signal processing.

Description of the Related Art

Image pickup apparatuses provided with a solid-state image pickup element include an apparatus that performs expansion processing of a dynamic range (hereinafter, also referred to as "DR") and outputs information about a distance from the image pickup apparatus to an object, in addition to outputting video signals that have been photoelectrically converted at a two-dimensionally arranged pixel portion. An apparatus disclosed in Japanese Patent Application Laid-Open No. 2005-175517 can switch gains of an amplification unit in a column circuit for output signals from a unit pixel and determine a gain such that the output signals are not clipped, thereby improving the DR of the video signals. FIG. 13 of Japanese Patent Application Laid-Open No. 2005-175517 discloses a circuit that has a two amplifier input capacitance, determines an input signal level by a gain setting unit, and changes to a gain corresponding to the determination result to obtain two types of gains. Additionally, the apparatus disclosed in Japanese Patent Application Laid-Open No. 2015-128253 has two column circuits for the output signals from the unit pixel, in which the video signals can be output with two types of gains because the gains of the amplifying unit in the column circuit are different.

Japanese Patent Application Laid-Open No. 2005-175517 discloses a method for determining an input signal level in a gain setting unit and setting a gain in accordance with the result for the determination. However, one gain must be set to the lowest gain value in order to determine the input signal level. Additionally, in Japanese Patent Application Laid-Open No. 2015-128253, although it is possible to output video signals having different gains by a plurality of column circuits, a method for determining the gain is not disclosed.

SUMMARY OF THE INVENTION

The object of the present invention is obtaining an image having a better S/N ratio (signal-to-noise ratio) in accordance with gain settings in an image pickup apparatus that enables amplifying signals based on the output of a photoelectric conversion unit by a plurality of gains.

An image pickup apparatus having a plurality of photoelectric converters of one aspect of the present invention comprises: at least one processor and at least one memory functioning as: an amplifier configured to output, for each gain, a signal obtained by amplifying a signal based on an output from the photoelectric converters corresponding to one exposure with a plurality of gains including a first gain and a second gain that is smaller than the first gain; and a controller configured to control the gains of the amplifier; and a generator configured to generate an image by processing a plurality of signals amplified by the amplifier and having different gains, wherein the controller performs control so as to change a value of the second gain and not to change a value of the first gain if the amplifier changes a plurality of gains used for amplification in different exposures.

Further features of the present invention will become apparent from the following description of exemplary embodiments (with reference to the attached drawings).

DESCRIPTION OF THE EMBODIMENTS

Hereinafter, each embodiment of the present invention will be described with reference to the drawings. The present invention is applicable to an image pickup apparatus such as a digital single-lens reflex camera, a digital still camera, and a digital video camera.

First Embodiment

Figure 1:
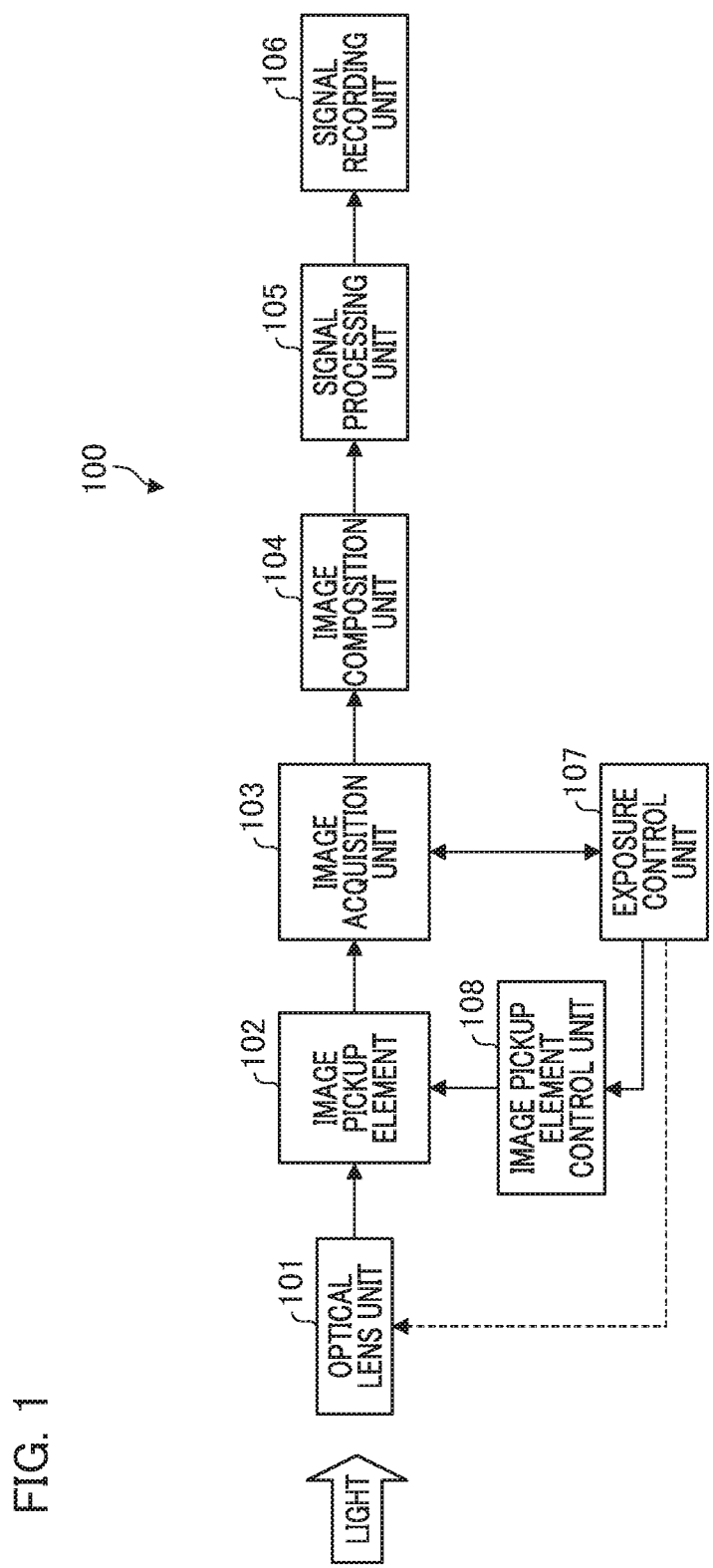
FIG. 1 is a block diagram illustrating a configuration of an image pickup apparatus according to the embodiments.

FIG. 1 is a block diagram illustrating a general configuration of an image pickup apparatus 100 according to the embodiment of the present invention. An optical lens unit 101 captures light from an object and forms an image on a light receiving surface of an image pickup element 102. The optical lens unit 101 is an interchangeable lens unit that is attachable to a main body of the image pickup apparatus 100 or a lens unit incorporated in the main body, and has an optical member such as a lens configuring an imaging optical system and a diaphragm.

The image pickup element 102 receives incident light from the optical lens unit 101 and outputs an electric signal by photoelectric conversion. Typical examples include a CCD (charge-coupled device) image sensor and a CMOS (complementary metal oxide semiconductor) image sensor. The image pickup element 102 has a first type for outputting an analog video signal and a second type for outputting a digital video signal by performing AD (analog digital) conversion processing inside the image pickup element 102. The second type has a form of outputting digital data by using LVDS (low voltage differential signaling) or the like. The configuration of the image pickup element 102 will be described below with reference to FIG. 2.

An image acquisition unit 103 includes a circuit unit that captures a video signal that has been output from the image pickup element 102 and performs various processes. The image acquisition unit 103 removes fixed pattern noise in the image pickup element 102, performs black level clamping processing, and the like. The image acquisition unit 103 also performs processing for dividing the signals into image signals to be used for recording the video image signal and an evaluation signal for controlling the image pickup element 102. The image acquisition unit 103 includes an internal storage circuit for storing a set value necessary for processing.

An image composition unit 104 (generator) acquires an output of the image acquisition unit 103, and generates an HDR (high dynamic range) image from a signal based on the output of the image pickup element 102 by using an arbitrary composition method. For example, there is a method for performing composition by using an image acquired at a high gain for a predetermined image portion (ordinary image), and performing composition by using an image acquired at a low gain for an image portion where highlight-detail loss occurs. It is preferable in a normal image used for the signal in the dark portion after composition that random noise in a dark portion is suppressed.

A signal processing unit 105 acquires the output of the image composition unit 104 and performs various image processes such as pixel addition, noise reduction, gamma correction, knee correction, digital gain processing, and defect-correction. The signal processing unit 105 includes an internal storage circuit for storing a set value necessary for correction and image processing.

A signal recording unit 106 acquires the video signals processed by the signal processing unit 105 and records the video signals in a storage device or a storage medium. For example, a memory device that is attachable to the main body of the image pickup apparatus 100 is used.

An exposure control unit 107 calculates an optimum exposure amount based on the video signal information that has been acquired from the image acquisition unit 103. In the case of the image pickup element 102 that can output phase difference information, the exposure control unit 107 can calculate a phase difference based on the output of the image pickup element 102. If the exposure control unit 107 has a function of focusing adjustment control, focusing adjustment is possible by calculating a defocus amount pertaining to an imaging optical system by correlation calculation based on the phase difference and driving the focus lens in the optical lens unit 101. Additionally, the exposure control unit 107 determines the operation of an image pickup element control unit 108 (controller) and transmits control signals. The image pickup element control unit 108 controls the operation of the image pickup element 102 in accordance with the control signals from the exposure control unit 107.

Figure 2:
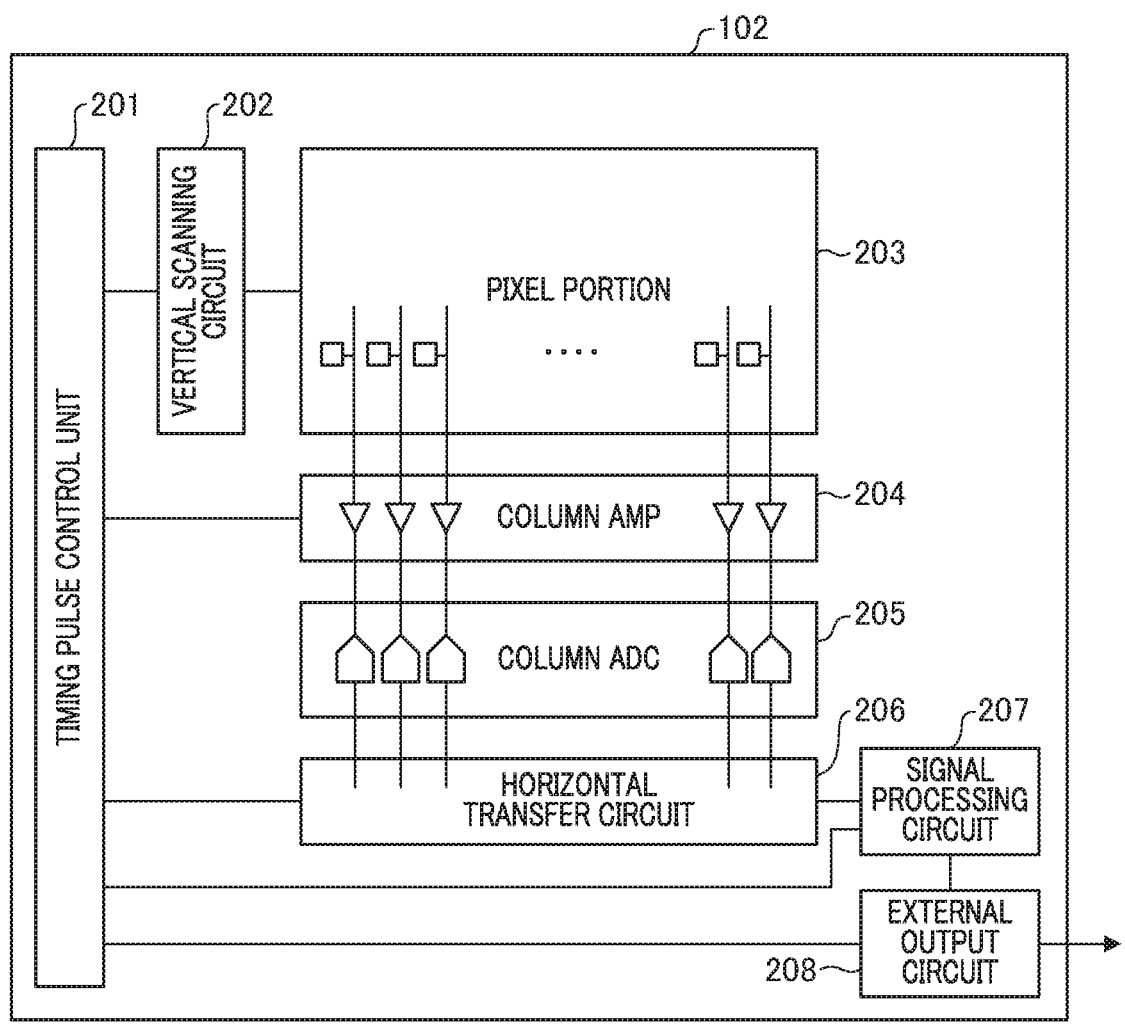
FIG. 2 schematically illustrates an internal configuration of a solid-state image pickup element.

The configuration of the image pickup element 102 will be described with reference to FIG. 2. FIG. 2 is a block diagram illustrating an example of the image pickup element 102. A timing pulse control unit 201 controls the operation of the image pickup element 102 by supplying operation clocks to each component of the image pickup element 102, and supplying a timing signal to each component. A vertical scanning circuit 202 performs timing control for sequentially reading out a pixel signal voltage from a pixel portion 203 within one frame. In general, the video signals are sequentially read out in units of rows from the upper row to the lower row in the pixel portion 203 within one frame. In the present embodiment, it is possible to select whether or not to output the phase difference information from the pixel portion 203.

The pixel portion 203 has a configuration in which many pixel units are arranged two-dimensionally. Each unit pixel has one or a plurality of photoelectric conversion units (photoelectric converters) and performs photoelectric conversion in accordance with the amount of incident light to output a voltage. A photoelectric conversion element such as a photodiode is used. The pixel portion 203 can also acquire and output the phase difference information together with a normal video image. For example, there is a structure in which a photodiode is divided into two parts with respect to one micro lens. However, the pixel portion 203 includes, in addition to the photoelectric conversion element, a transistor that transfers charges to a floating diffusion unit, an amplification transistor, and the like, and a detailed description thereof will be omitted because the circuit configuration is publicly known.

A column amplifier 204 electrically amplifies the signals that have been read out for each column from the pixel portion 203. By amplifying the signals by the column amplifier 204, pixel signals are amplified for a noise generated at a column ADC 205 in the subsequent stage, and thereby the S/N ratio can be equivalently improved. Additionally, in the column amplifier 204, an amplifier gain can be changed by the signals from the timing pulse control unit 201. For HDR image generation, the image pickup element 102 can output signals with two types of gains by changing the amplifier gain of the column amplifier 204. Specifically, the column amplifier 204 can output signals, for each gain, obtained by multiplying a signal, which has been output from a plurality of photoelectric conversion units of image pickup element 102 in a single exposure, at a certain time by two gains, and thus, although the data amount increases, can acquire image signals having two different gains that have simultaneity. The configuration of the column amplifier 204 will be described below.

The column ADC (analog-to-digital converter) 205 acquires analog signals from the column amplifier 204 and converts the analog signals into digital signals. The digital signals are sequentially read out by a horizontal transfer circuit 206. The output of the horizontal transfer circuit 206 is input to a signal processing circuit 207.

The signal processing circuit 207 is a circuit that performs digital signal processing. The signal processing circuit 207 performs the digital signal processing to add a fixed amount of offset value, and in addition, perform shift calculation and multiplication, thereby to easily perform gain calculation. Additionally, if the pixel portion 203 has a pixel region intentionally shielded from light, a black level clamping operation may be performed by the digital processing using the pixel region.

An external output circuit 208 acquires signals from the signal processing circuit 207 and performs output processing. The external output circuit 208 has a serializer function and converts multi-bit input parallel signals from the signal processing circuit 207 into serial signals. The external output circuit 208 also converts the serial signals into, for example, LVDS signals, and outputs image information to an external device.

Figure 3:
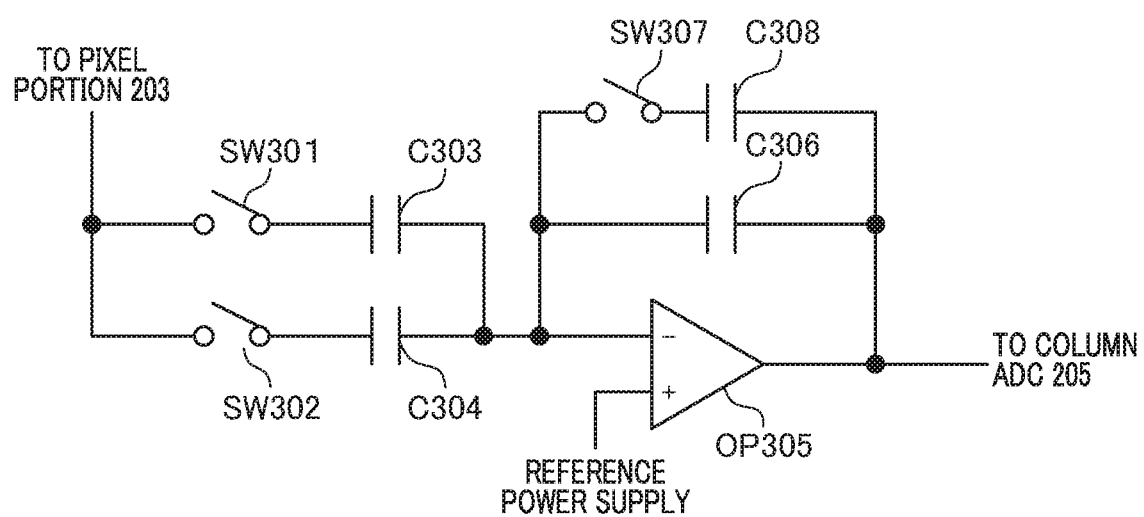
FIG. 3 is a circuit diagram illustrating a configuration of one column amplifier according to the embodiments.

Next, the operation of the image pickup element 102 during HDR image generation, and the image composition unit 104 will be described in detail. The image pickup element 102 according to the present embodiment can output signals by changing the gain of the column amplifier 204 in order to generate an HDR image. With reference to FIG. 3, an example of a circuit of the column amplifier unit during HDR image generation will be described. FIG. 3 is a circuit diagram illustrating one column in the column amplifier 204. A capacity portion is denoted by "C", a switch element (for example, a transistor) is denoted by "SW", and an operational amplifier is denoted by "OP".

An input capacitance and a feedback capacitance are connected to an OP 305. A voltage from a reference power supply is applied to a non-inverting input terminal of the OP 305, and C303 and a C304, which are input capacitances, are connected to an inverting input terminal of the OP 305. The series circuit of SW301 and C303 and the series circuit of SW302 and C304 are respectively connected in parallel, and the SW301 and the 5302 are connected to the pixel portion 203.

C306 and C308 are feedback capacitance. The C306 is provided in parallel with the series circuit of SW307 and C308. ON of the SW307 connects C306 and C308. An amplification factor of the column amplifier is determined based on electrostatic capacitance of the C303 and the C304 and the electrostatic capacitance of the C306 and the C308, and is calculated from "input capacitance/feedback capacitance". The column amplifier of the present embodiment has two input capacitances. If the SW 301 is ON and the SW302 and the SW307 are OFF, signals obtained by multiplying a first gain that corresponds to the electrostatic capacitance ratio between the input capacitance C303 and the feedback capacitance C306 can be output to the column ADC 205. Additionally, if the SW301 is OFF and the SW302 and the SW307 are ON, signals obtained by multiplying a second gain that corresponds to the electrostatic capacitance ratio between the input capacitance C304 and the combined capacitance of the feedback capacitance C306 and C308 can be output to the column ADC 205. Thus, a plurality of gains corresponding to the amplification factor of the column amplifier in accordance with the combination of the input capacitance and the feedback capacitance are determined. It is possible to output a plurality of image signals based on the signals having different gains. Note that if the input capacitance and the feedback capacitance shown in FIG. 3 are increased as necessary, the number of combinations can be further increased.

Figure 4A:
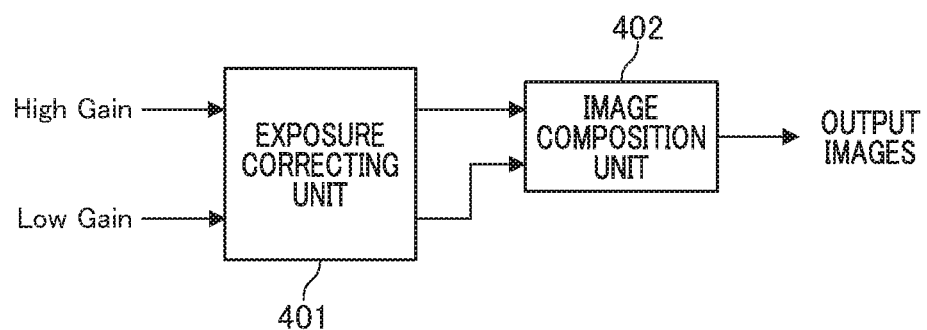
FIGS. 4A and 4B are block diagrams illustrating image composition in the first and second embodiments.

FIG. 4A is a block diagram illustrating an exposure correcting unit 401 (corrector) and an image composition unit 402 (composer). For two images based on signals obtained by multiplying the two types of gains that have been output from the image pickup element 102, a high gain image having a high gain is denoted by an "H-image", and a low gain image having a low gain is denoted by an "L-image". After the H-image and the L-image are corrected by the exposure correcting unit 401, the image composition unit 402 generates one composite image.

The exposure correcting unit 401 acquires each signal of the H-image and the L-image and performs exposure correction to equalize the gain of the H-image and the gain of the L image. This is to obtain output signals having a linear characteristic relative to the input signals when the image composition unit 402 in the subsequent stage composites images into one image.

FIG. 5 is a graph illustrating the relation between the amounts of input light and the output code after AD conversion. The horizontal axis represents the amounts of input light for the H-image and the L-image, and the unit is a candela (cd). The vertical axis represents the output code after AD conversion. The word "High" indicates a graph of the H-image (bold line) and the word "Low" indicates a graph of the L-image (thin Line).

Figure 5A:
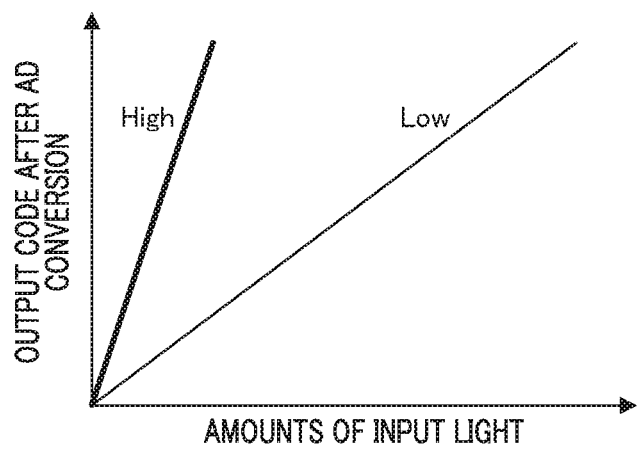
FIGS. 5A, 5B and 5C illustrate relations between an amount of input light and an output code after AD conversion.
Figure 5B:
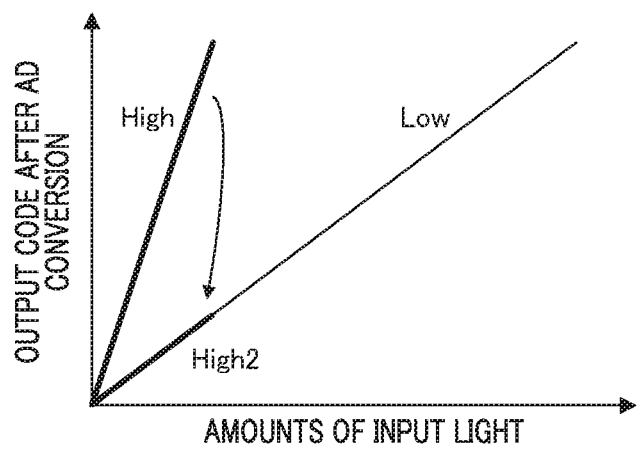

FIG. 5A illustrates a state in which the brightness of the image differs between the H-image and the L-image. This is a state before exposure correction, where the two images cannot be combined as-is. Hence, the exposure correcting unit 401 performs gain multiplication processing in order to match the brightness between the H-image and the L-image. FIG. 5B illustrates an example in which the brightness of the H-image is adjusted to the brightness of the L-image. A High Gain 2 image, which is an image obtained by correcting the exposure of the H-image and adjusting the brightness to the L-image, is denoted by "H2-image" (see "High 2" in FIG. 5). In this case, the gain value used for the exposure correction is smaller than 1. In contrast, the brightness of the L-image can also be adjusted to the brightness of the H-image. The gain value used in this case is larger than 1.

Figure 5C:
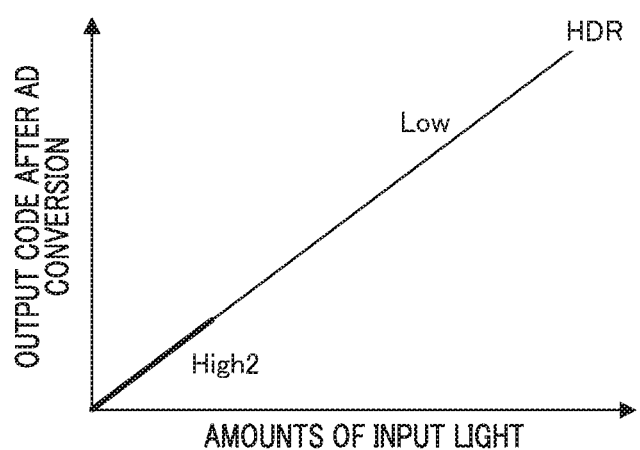

FIG. 5C illustrates a graph after image composition. The image composition unit 402 executes composition processing of the H2 image and the L-image. The image composition is performed, where the H2 image is used in an image part having a small amount of input light and the L-image is used in an image part having a large amount of input light. Since a column amplifier (FIG. 3), in other words, an analog amplifier circuit, is used for the H-image, the noise component of the H-image is smaller than that of the L image. Therefore, the S/N ratio of the composite image improves.

Next, with reference to FIG. 6, a description will be given of the relation between amounts of input light and the output code after AD conversion when the gain is changed to twice the relation between the H-image and the L-image shown in FIG. 5 in accordance with the instruction from the photographer. The settings of the horizontal axis and the vertical axis in FIG. 6 are the same as those in FIG. 5.

Figure 6A:
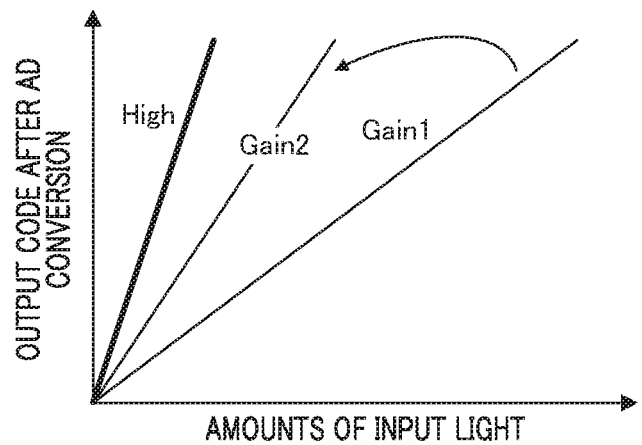
FIGS. 6A, 6B and 6C illustrate another example of relations between the amount of input light and the output code after AD conversion.
Figure 6B:
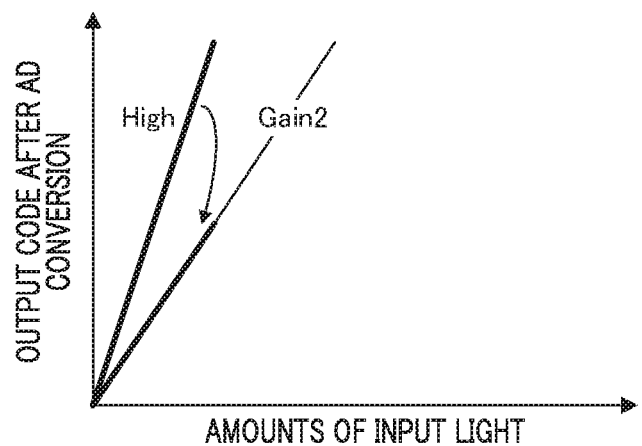

FIG. 6A illustrates a graph in which the Gain 1 pertaining to the L-image is doubled (Gain 2) by using the column amplifier (FIG. 3), and the gain of the image pickup apparatus corresponding to the brightness of the entire image is doubled. FIG. 6B illustrates an example in which the brightness of the H-image is adjusted to the brightness of the L-image. An image in which the gain of the column amplifier 204 pertaining to the L-image by 2 is doubled is denoted by an "L2 image" (see "Gain 2" in FIG. 6). The gain of the column amplifier 204 is determined by control signals from the image pickup element control unit 108 to the image pickup element 102.

The exposure correcting unit 401 performs gain multiplying processing so as to adjust the brightness of the H-image to the that of the L2 image. The gain value in this case is larger than that in the example shown in FIG. 5 (in contrast, if the brightness of the L2 image is adjusted to that of the H-image, the gain becomes relatively small.). Therefore, in the graph after image composition shown in FIG. 6C, the ratio of the H-image (see High 2) to the entire output code is larger than that in the example of FIG. 5C.

Figure 6C:
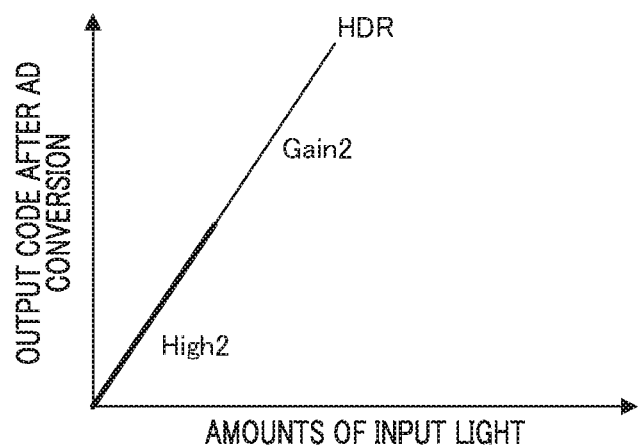

In the present embodiment, the gain (high gain) of the column amplifier pertaining to the H-image is set to a constant value regardless of the gain of the column amplifier pertaining to the L-image. As shown in FIG. 6C, the L-image is used for a bright image part of an object. In a dark image part, the H2 image based on signals amplified by a high gain (constant value) of the column amplifier is used. Thus, although a value of the second gain (low gain) that is smaller than the first gain (high gain) is changed, a value of the first gain is not changed.

According to the present embodiment, the S/N ratio of the composite image can be kept high even if the gain settings of the image pickup apparatus are changed by a user instruction or automatic control. Note that the algorithm related to composition of two images having different gains may be arbitrary, and the present invention is not limited to the present embodiment.

Second Embodiment

Figure 4B:
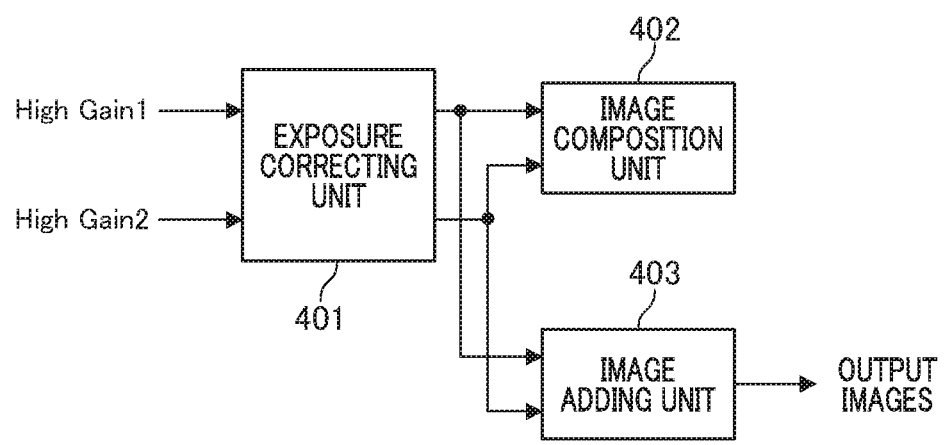

Next, the second embodiment of the present invention will be described. In the present embodiment, a difference from the first embodiment will be mainly described, and the detailed description of the matters that are the same as those of the first embodiment will be omitted by using the reference numerals and symbols already used. As described in the first embodiment, the brightness of the image is determined by the L-image. If the photographer increases the gain setting value for the image pickup apparatus, signals having a gain that is the same as or about the same as that of the L-image are output also for the H-image. In that case, a process that outputs image signals by using an image adding unit 403 (adder) shown in FIG. 4B is performed. Note that "about the same" means that the difference between the two gain values is equal to or less than a threshold.

The exposure correcting unit 401 acquires each of the signals of the High Gain 1 and the High Gain 2, which are two H-images, and finely adjusts the brightness of the two H-images. This is to eliminate or reduce minute variations between the input capacitance C303 and C304 shown in FIG. 3. After adjusting the brightness of the two H-images, the image adding unit 403 adds the signals of the two H-images in pixel units. By adding the two H-images, noise components generated in the column amplifier 204 can be suppressed.

In the present embodiment, if the difference between the two gain values is larger than a threshold, the image composition unit 104 performs image composition processing as in the first embodiment. If the gain of the column amplifier 204 pertaining to the L-image increases to reach a gain that is the same as or about the same as the H-image, the image composition is switched to the image addition. By adding signals in pixel units by the image adding unit 403, the S/N ratio can be further improved.

According to the present embodiment, in an image pickup apparatus that enables amplification with a plurality of gains for each signal based on the output of the photoelectric conversion unit, an image having a better S/N ratio can be acquired in accordance with a specified gain (for example, a gain setting value intended by the photographer) regardless of objects. Note that, in the above embodiment, a method for changing the gain by controlling the amplification factor of the column amplifier is shown. In addition, there is a method for changing the gain by controlling the connection and disconnection of an additional capacitance to a FD (floating diffusion) unit of the pixel portion.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-077864, filed on Apr. 16, 2019, which is hereby incorporated by reference herein in its entirety.

What is claimed is:

1. An image pickup apparatus having a plurality of photoelectric converters, the image pickup apparatus comprising:
    at least one processor and at least one memory functioning as:
    an amplifier configured to output, for each gain, a signal obtained by amplifying a signal based on an output from the photoelectric converters corresponding to one exposure with a plurality of gains including a first gain and a second gain, which is smaller than the first gain; and
    a controller configured to control the gains of the amplifier; and
    a generator configured to generate an image by processing a plurality of signals amplified by the amplifier and having different gains,
    wherein, in a specific mode, the controller performs a control so as to change a value of the second gain and not to change a value of the first gain if the amplifier changes a plurality of gains used for amplification in different exposures.

2. The image pickup apparatus according to claim 1,
    wherein the generator comprises:
    a corrector configured to acquire a first image signal multiplied by the first gain and a second image signal multiplied by the second gain to perform exposure correction; and
    a composer configured to generate a composite image signal from a plurality of image signals that have been corrected by the corrector.

3. The image pickup apparatus according to claim 2,
    wherein the generator includes an adder configured to add the first and second image signals that have been corrected by the corrector in units of pixels.

4. The image pickup apparatus according to claim 2,
    wherein, when a difference between the value of the first gain and the value of the changed second gain is larger than a threshold, the composer generates a signal of the composite image.

5. The image pickup apparatus according to claim 3,
    wherein, when the difference between the value of the first gain and the value of the changed second gain is a threshold or less, the adder generates an image signal by addition.

6. The image pickup apparatus according to claim 1,
    wherein an image pickup element includes the amplifier configured to amplify signals for each column of a pixel portion, and wherein the image pickup element outputs a plurality of signals amplified by the first and second gains that have been determined by the controller.

7. The image pickup apparatus according to claim 1, wherein the value of the second gain is changed by a user instruction.

8. The image pickup apparatus according to claim 1, wherein the change of the value of the second gain is made by an automatic control.

9. A control method of an image pickup apparatus that includes a pixel portion having a photoelectric converter, the control method comprising:

controlling a gain of an amplifier that amplifies a signal based on an output of the photoelectric converter;

amplifying the signal with a plurality of gains by the amplifier; and generating an image by processing a plurality of signals amplified by the amplifier and having different gains, wherein, in the controlling, a value of a second gain, which is smaller than a first gain, among the gains is changed, and a control not to change the value of the first gain is performed.

10. The image pickup apparatus according to claim 1, wherein the specific mode is for generating an HDR image.

11. The image pickup apparatus according to claim 1, wherein the image generated by the generator is an HDR image.

12. An image pickup element having a plurality of photoelectric converters, the image pickup element comprising:

an amplifier configured to output, for each gain, a signal obtained by amplifying the signal based on an output from the photoelectric converters corresponding to one exposure with a plurality of gains including a first gain and a second gain, which is smaller than the first gain; and a controller configured to control the gains of the amplifier, wherein, in a specific mode, a value of the second gain is changed and a value of the first gain is not changed if the amplifier changes a plurality of gains used for amplification in different exposures.

13. The image pickup element according to claim 12, wherein the amplifier amplifies signals for each column of a pixel portion, and wherein a plurality of signals amplified by the first and second gains is output.

14. The image pickup element according to claim 12, wherein the value of the second gain is changed by a user instruction.

15. The image pickup element according to claim 12, wherein the change of the value of the second gain is made by an automatic control.

16. The image pickup element according to claim 12, wherein the specific mode is for generating an HDR image.

17. The image pickup element according to claim 12, wherein the generated image is an HDR image.

* * * * *